(12) United States Patent
Arsenault et al.

(10) Patent No.: US 8,379,818 B2
(45) Date of Patent: Feb. 19, 2013

(54) METHOD AND APPARATUS FOR CONVEYING A CALLING PARTY IDENTIFIER

(75) Inventors: Jonathan Allan Arsenault, Orleans (CA); Shafiq Shiraz Manji, Toronto (CA)

(73) Assignee: BCE Inc., Verdum (CA)

( * ) Notice: Subject to any disclaimer, the term of this patent is extended or adjusted under 35 U.S.C. 154(b) by 1087 days.

(21) Appl. No.: 12/345,395

(22) Filed: Dec. 29, 2008

(65) Prior Publication Data

US 2009/0274284 A1 Nov. 5, 2009

Related U.S. Application Data

(60) Provisional application No. 61/017,340, filed on Dec. 28, 2007.

(51) Int. Cl.
*H04M 1/56* (2006.01)
*H04M 15/06* (2006.01)

(52) U.S. Cl. ............ 379/142.1; 379/142.06; 379/142.09

(58) Field of Classification Search ............. 379/142.01, 379/142.02, 142.04, 142.06, 142.09, 142.17, 379/245, 207.12, 207.14, 207.15
See application file for complete search history.

(56) References Cited

U.S. PATENT DOCUMENTS

| | | | | | |
|---|---|---|---|---|---|
| 5,864,612 | A | * | 1/1999 | Strauss et al. | 379/142.03 |
| 6,137,870 | A | * | 10/2000 | Scherer | 379/127.06 |
| 6,744,868 | B2 | * | 6/2004 | Mani | 379/201.02 |
| 6,771,755 | B1 | * | 8/2004 | Simpson | 379/142.04 |
| 7,016,482 | B2 | * | 3/2006 | Moss et al. | 379/142.09 |
| 7,263,181 | B2 | * | 8/2007 | Chung | 379/201.06 |
| 8,064,582 | B2 | * | 11/2011 | Ma et al. | 379/142.09 |
| 8,150,012 | B2 | * | 4/2012 | Shah | 379/142.11 |
| 2002/0181681 | A1 | * | 12/2002 | Mani | 379/142.03 |
| 2003/0152205 | A1 | * | 8/2003 | Winkler | 379/142.06 |
| 2003/0198326 | A1 | * | 10/2003 | Wei | 379/142.14 |
| 2005/0031106 | A1 | * | 2/2005 | Henderson | 379/142.17 |
| 2010/0208878 | A1 | * | 8/2010 | Nakao | 379/142.06 |

* cited by examiner

*Primary Examiner* — Binh Tieu
(74) *Attorney, Agent, or Firm* — Murray IP Consulting Inc.; Sean Murray

(57) ABSTRACT

A method and system is disclosed for presenting differentiated calling party identifiers representative of a calling party to various called parties based on the identifier information for a particular called party. The differentiated calling party identifier that is conveyed to a called party may be selected from a list of calling party identifiers associated with the calling party. The system receives an indication of an attempt to initiate a call by a calling party which includes identifier information indicative of the called party, determines a calling party identifier to be conveyed to the called party based on the identifier information indicative of the called party and causes an appropriate calling party identifier to be conveyed in association with the initiated call.

40 Claims, 3 Drawing Sheets

METHOD AND APPARATUS FOR CONVEYING A CALLING PARTY IDENTIFIER

CROSS-REFERENCE TO RELATED APPLICATIONS

This application claims the benefit under 35 USC 119(e) of U.S. Provisional Patent Application 61/017,340 filed on Dec. 28, 2007 and hereby incorporated by reference herein.

FIELD OF THE INVENTION

The present invention relates to telephony systems and, more particularly, to a method and apparatus for conveying a calling party identifier.

BACKGROUND

When a called party receives a telephone call from a calling party, the called party often desires some form of identification of the calling party and/or calling party number in order to decide whether or not they want to take the call. For example, many people will not answer a telephone call if their caller line identification (CLID) displays that the calling party identifier information is "unavailable," "unknown," "private" or the like. Even if a call is answered by a called party, the calling party identifier information is useful for contacting the calling party where the called party decides to call the calling party back at a later time.

The caller line identification (CLID) service offered by telephone companies today provides a called party (subscribing to the CLID service) with identification information about a calling party. To date, the calling party identifier or CLID information has been limited to the information that the telephone company has in its own caller ID database for the line of the originating call. Specifically, if a call originates on a plain old telephone service (POTS) line, caller line ID (or CLID) is provided by the local service provider's switch (e.g. in a Calling Party Number Message). Typically, if a called party subscribes to a caller ID service, the called party will see at least the telephone number for the originating line (if available) and, in some instances, may also see an account name associated with that number if such account name is in a database used by the telephone company receiving or processing the call.

In some circumstances, it may be desirable for a calling party to convey customized CLID information to a certain called party. For example, U.S. patent application Ser. No. 09/898,787 describes a method and system for call centers to present customized CLID information to a called party based on client calling campaigns and independent of the telephone line from which the call actually originated. Specifically, in this system, the CLID information presented to a called party corresponds to a customized CLID that is indicative of a business entity or client on behalf of which the call is being made. Other situations exist, however, where it may be desirable to provide a different CLID to a certain called party independent of the primary registered line associated with the originating call.

SUMMARY OF THE INVENTION

In accordance with a first broad aspect, the invention provides a method for modifying the calling party identifier information associated with an initiated call originated by a calling party and destined for a called party comprising receiving identifier information indicative of the called party, determining a calling party identifier to be conveyed to the called party based on the identifier information indicative of the called party and causing the calling party identifier to be conveyed in association with the initiated call.

In accordance with a second broad aspect, the invention provides a network entity comprising an input for receiving an indication of an attempt by a calling party to place a call to a called party wherein said indication comprises identifier information indicative of the called party, a processing unit for determining a calling party identifier to be conveyed to the called party based on the identifier information indicative of the called party and causing the calling party identifier to be conveyed in association with the call.

In accordance with a third broad aspect, the invention provides a computer-readable storage medium comprising a program element for execution by a network entity, said program element comprising first program code for detecting receipt of an indication of an attempt by a calling party to place a call to a called party, said indication comprising identifier information indicative of the called party, second program code for determining a calling party identifier to be conveyed to the called party based on the identifier information indicative of the called party and third program code for causing the calling party identifier to be conveyed in association with the call.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of certain embodiments of the present invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF NON-LIMITING EMBODIMENTS

Figure 1:
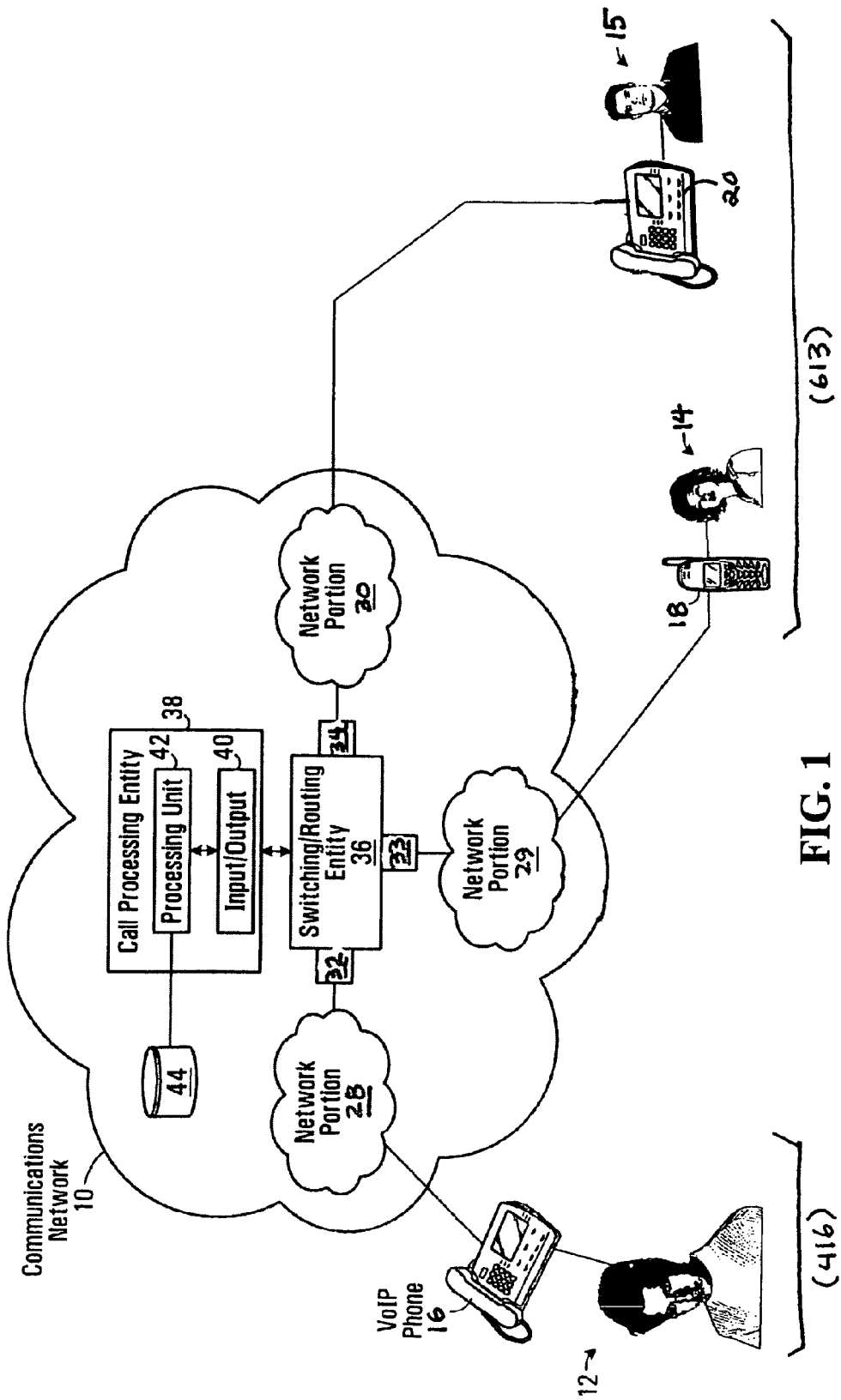
FIG. 1 shows a communication network comprising a call processing entity for processing calls made from communication devices in accordance with a non-limiting embodiment of the present invention.

Shown in FIG. 1 is a non-limiting example of an architecture for a communications network 10 that is suitable for enabling communication between communication devices associated to different customers, such as customers 12, 14 and 15. Although only three customers 12, 14 and 15 are shown in FIG. 1, it should be appreciated that the communications network 10 is suitable for enabling communication between hundreds of thousands of customers (if not more) via their associated communication devices.

In the example shown in FIG. 1, customer 12 is associated with a single communication device; namely communication device 16 which is a VoIP phone. Customer 14 is associated with their own communication device, namely communication device 18 which is a cellular phone. Customer 15 is associated with their own communication device, namely communication device 20 which is a regular POTS phone. Any of communication devices 16, 18 and 20 can be employed respectively by customers 12, 14 and 15 to effect telephonic communications, including handling incoming calls, originating outgoing calls, and participating in calls in progress.

Although communication device 16 is customer 12's VoIP phone, communication device 18 is customer 14's cellular phone and communication device 20 is customer 15's home phone (which in the example shown is a regular POTS phone), it should be appreciated that each of the communication devices 16, 18 and 20 could be any type of communication device suitable for originating, receiving and participating in communications with other communication devices through the communications network 10. For example, each one of the communication devices 16, 18 and 20 could be any one of a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software) or a telephony-enabled television (TV) unit (e.g., a set-top box connected to a television and a remote control). Depending on the functionality of each communication device 16, 18 and 20, a call originated by, destined for, or in progress at any one of the communication devices 16, 18 and 20 may be a voice call, a video call, a multimedia call, or any other type of call. Although customers 12, 14 and 15 are each associated with only one respective communication device 16, 18 and 20 in this example, it should be appreciated that in various other embodiments, customers 12, 14 and 15 could be associated with any number of communication devices.

The communications network 10 shown in FIG. 1 includes network portions 28, 29 and 30 that enable the handling of incoming calls, outgoing calls and calls in progress for communication devices 16, 18 and 20. Each of the communication devices 16, 18 and 20 is connected to a switching/routing entity 36 via a respective one of the network portions 28, 29 and 30 of the communications network 10. As will be described in more detail below, the communications network 10 may comprise a portion of one or more of the Public Switched Telephone Network (PSTN), a wireless network (e.g., a cellular network), and a data network (e.g., the Internet). The switching/routing entity 36 enables the communication devices 16, 18 and 20 to reach or be reached by any of various other communication devices (which are not shown for the sake of simplicity).

The nature of the network portions 28, 29 and 30 and the switching/routing entity 36 will depend on the nature of the communication devices 16, 18 and 20 being used, and where the switching/routing entity 36 resides in the communications network 10.

For example, the communication device 16 is a VoIP phone (or a POTS phone equipped with an ATA) and, as such, the switching/routing entity 36 may reside in a data network. In such a case, the network portion 28 may comprise a digital communications link (e.g., Ethernet) and the switching/routing entity 36 may be part of a router (e.g., an edge router or a core router) or a softswitch. In accordance with a specific non-limiting example, the switching/routing entity 36 can be the MCS 5200 Soft Switch manufactured by Nortel Networks Limited of 8200 Dixie Road, Brampton, Ontario L6T 5P6, Canada, although it should be appreciated that this is but one non-limiting example among many possibilities within the scope of the present invention.

The communication device 18 is a wireless communication device, and as such, the switching/routing entity 36 may reside in a wireless network. In addition, the network portion 29 may comprise a wireless link in combination with a base station and a network-side wireline link, and the switching/routing entity 36 may be part of a mobile switching center (MSC).

The communication device 20 is a wired POTS phone, and as such, the switching/routing entity 36 may reside in the PSTN environment. In addition, the network portion 30 may comprise a telephone line in the PSTN and the switching/routing entity 36 may be part of a central office switch.

In yet another non-limiting example of implementation, where a communication device (not shown) is a soft phone, its associated network portion may comprise a digital communications link (e.g., a digital subscriber line (DSL) link or a coaxial cable) and the switching/routing entity 36 may be part of a server equipped with a modem. It will be appreciated that various other implementations of network portions and the switching/routing entity 36 are possible (e.g., such as where the communication device is a telephony-enabled TV unit).

It will also be appreciated that, as shown in FIG. 1, the switching/routing entity 36 may span across different networks (i.e., PSTN, wireless, and/or data) in which case the switching/routing entity 36 comprises one or more gateways 32, 33 and 34 for enabling communication and interoperability between these networks. Alternatively, the switching/routing entity 36 may not include the gateways 32, 33 and 34, in which case the gateways could be part of a separate server that is not shown. Such gateways are well known to those skilled in the art and need not be described in further detail herein.

The switching/routing entity 36 is operative to effect switching/routing operations to help route an outgoing call originating from a calling party device (e.g. one of the communication devices 16, 18 and 20) and destined for a called party device. In addition, the switching/routing entity 36 is operative to effect switching/routing operations to help route an incoming call originated at a particular calling party device and destined for a called party device (e.g. one of the communication devices 16, 18 and 20). Furthermore, the switching/routing entity 36 is communicatively coupled to a call processing entity 38, which will be described below, and interacts therewith. It will be appreciated that the switching/routing entity 36 comprises suitable hardware, firmware, software, control logic, or a combination thereof for implementing its functionality.

Referring back to FIG. 1, the call processing entity 38 is communicatively coupled to a database 44, and is operative to interact with the switching/routing entity 36 and the database 44 in order to effect various call processing operations when a communication device (such as any of communication devices 16, 18 and 20) receives an incoming call, originates an outgoing call, or participates in a call in progress.

Figure 2:
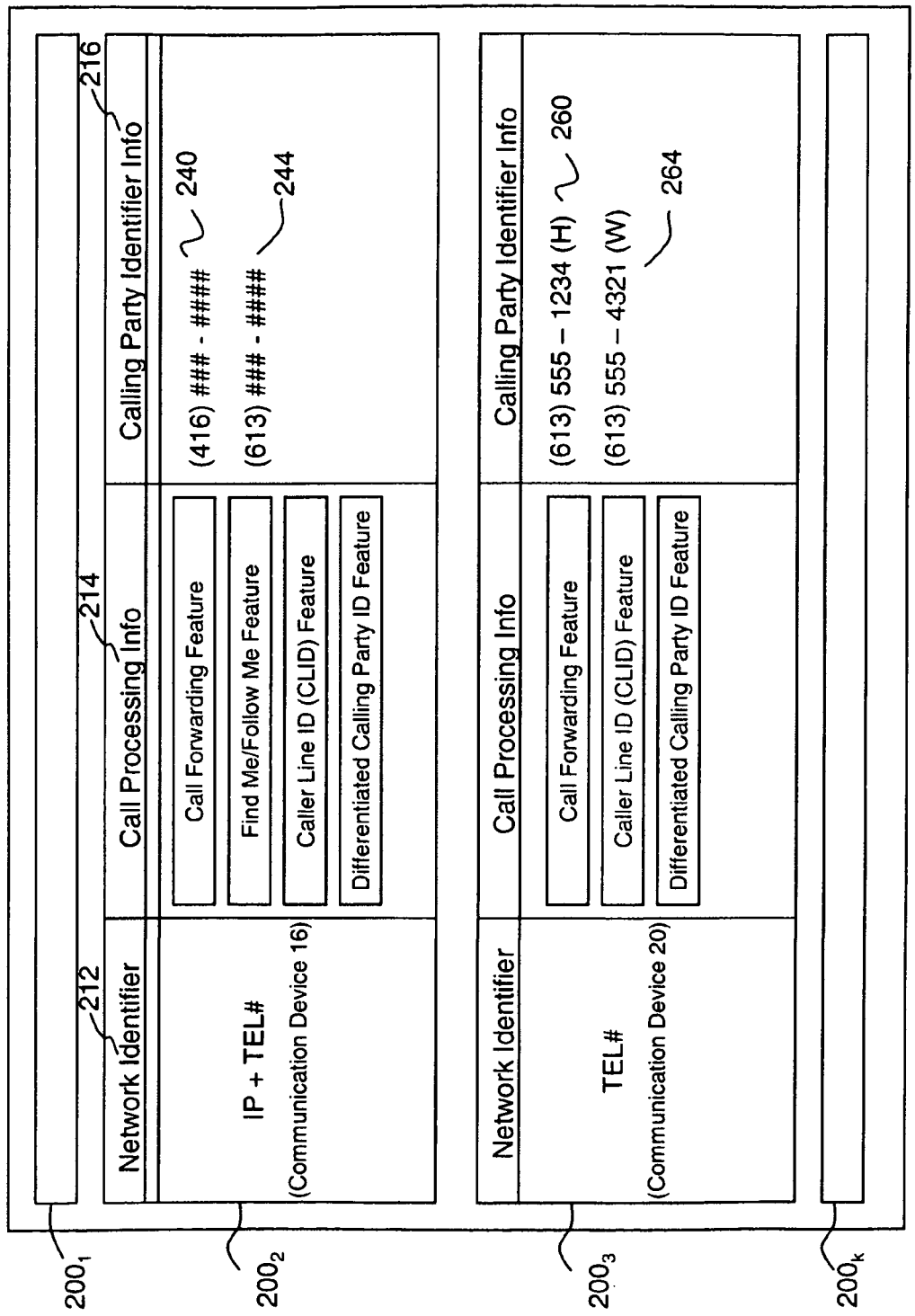
FIG. 2 shows an example of the potential contents of the database shown in FIG. 1.

FIG. 2 shows a non-limiting example of the potential contents of the database 44. In the example shown, the database 44 stores a plurality of records $200_1$-$200_k$ each associated with a respective customer (such as customers 12, 14 and 15). Each record identifies a communication device that may be associated with a customer, such as customer 12, for example. As such, it should be appreciated that communication device listed in record $200_2$ is associated with customer 12, whereas the communication device listed in record $200_3$ is associated with customer 14.

In accordance with the present invention, each of records $200_2$-$200_3$ stores an association between its respective communication device and at least one calling party identifier associated with that particular communication device.

More specifically, each of records $200_2$ and $200_3$ includes a network identifier 212 for identifying each communication device, call processing information 214 associated with each communication device, and a calling party identifiers list 216 that is particular to each communication device.

The network identifier 212 is a unique identifier that is associated with each communication device, such that the call processing entity 38 can identify when a call is originating from, or destined for a given communication device. For example, the network identifier 212 can be a telephone number identifying a telephone line associated with a regular POTS communication device, an electronic serial number (ESN) and/or telephone number associated with a wireless communication device, or an IP address and/or telephone number (and/or another Uniform Resource Identifier (URI) such as a Session Initiation Protocol (SIP URI)) used by a VoIP phone, an ATA-equipped POTS phone, or a softphone. Although not specifically depicted in FIG. 2, in addition to a network identifier 212, each entry or record may also include a party or account identifier, such as the name and/or billing address of a customer associated with a given communication device.

In FIG. 2, each entry further includes call-processing information 214 associated with a communication device. The call-processing information 214 associated with a given communication device can take on many forms. In the embodiment shown, the call processing information 214 is indicative of telephony features associated with each communication device. These telephony features can be features that are subscribed to by a user of the communication device or that are available to all communication devices being handled by a given service provider.

As will be described below, most telephony service providers provide a plurality of telephony services that will affect the way either an incoming communication, an outgoing communication, or a communication in progress is handled. As such, the telephony feature information that is stored in the database 44 is used by the call processing entity 38 during the processing of calls, or during the processing of other communications such as text messages, in order to apply appropriate telephony features.

It will be appreciated that subscription to different telephony features may be completely independent from one customer to another or from one communication device to another, and there is no restriction on a number or combination of features that may be subscribed to by any one customer. In some cases, a customer may not subscribe to any telephony features, while in other cases a customer may subscribe to all available telephony features.

Some non-limiting examples of available telephony features include:

a call forwarding feature, whereby every incoming call destined for a given communication device associated to a customer is to be forwarded to a second communication device associated to the customer;

a selective call forwarding feature, whereby incoming calls that are originated by one or more communication devices associated with a selected given party, and destined for a communication device associated with the customer are to be forwarded to a second communication device associated with the customer.

a no-answer call forwarding feature, whereby an incoming call destined for a first communication device associated with the customer is to be forwarded to a second communication device associated with the customer if the incoming call is not answered on the first communication device within a predetermined period of time (e.g., ringing cycle);

a "find me/follow me" (FM/FM) call forwarding feature, whereby an incoming call is to be forwarded to a plurality of communication devices associated with the customer either simultaneously or sequentially (e.g., until the call is answered or until all the communication devices have been used and the call remains unanswered, in which case the call can be forwarded to a voicemail system);

a first distinctive ringing feature, whereby incoming calls destined for a communication device are to be announced by different audio signals (e.g., ring tones or songs) produced by the communication device when they originate from communication devices associated with different calling parties;

a selective call rejection feature, whereby an incoming call originated by any of one or more communication entities each associated with a given party and destined for a communication device associated with the customer is prevented from reaching the communication device associated with the customer;

a selective call acceptance feature, whereby only an incoming call originated by a communication device associated with a given party and destined for a communication device associated with the customer is allowed to reach the communication device associated with the customer;

a call waiting feature, whereby a communication device participating in a call in progress produces a notification for the user of the communication device of an incoming call destined for the communication device;

a calling line identification (CLID) displaying feature, whereby CLID information associated with a communication device originating a call that is destined for a communication device associated with the customer is displayed by the communication device associated with the customer;

a CLID blocking feature, whereby CLID information (e.g., a telephone number and/or a name or other party identifier) associated with a communication device with which the customer originates an outgoing call destined for a communication device belonging to another party is not provided to the communication device belonging to the other party; and a speed calling feature, whereby an outgoing call destined for any of one or more communication devices that are associated with the same or different predetermined party can be originated by inputting into a communication device associated with the customer a specific code (e.g., a one or two digit code) that is shorter than the telephone number associated with the communication device for which the outgoing call is destined.

It is to be understood that these examples of telephony features are presented for illustrative purposes only and are not to be considered limiting in any respect as various other telephony features are or may become available in the future.

A customer who subscribes to one or more of the telephony features listed above is generally able to configure the manner in which the telephony features work. This configuration can be done by interacting with a representative, an interactive voice response (IVR) unit, or a data network site (e.g., a web site) associated with a provider of the features.

As mentioned above, record $200_2$ shown in FIG. 2 is associated with customer 12, such that the communication device listed within record $200_2$ is the communication device 16 associated with customer 12. Record $200_2$ includes a respective different network (or device) identifier for the communication device 16, which in the embodiment shown includes an IP address and telephone number associated with communication device 16 (which, in this example, is a VoIP phone). In addition, record $200_2$ includes an indication of call processing information for communication device 16. As shown, customer 12 subscribes to the "call forwarding" feature and the "find me/follow me" feature. In addition, as will be described in more detail below, customer 12 also subscribes to a "differentiated calling party ID" feature for communication device 16.

Record $200_3$, shown in FIG. 2 is associated with customer 15, such that the communication device listed within record $200_3$ is the communication device 20 associated with customer 15. Record $200_3$ includes a respective different network identifier for communication device 20 which, in the embodiment shown, includes a telephone number associated with communication device 20 (which is a regular POTS phone). In addition, record $200_3$ includes an indication of the call processing information 214 for communication device 20. As shown, customer 15 subscribes to the "distinctive ring tone" feature, the "caller line identification (CLID)" feature and the "call waiting" feature for communication device 26. In addition, and as will be described in more detail below, customer 15 also subscribes to a "differentiated calling party ID" feature for communication device 20.

The "differentiated calling party ID" feature is a calling feature that provides a calling party the ability to present a customized or differentiated CLID to a given called party (assuming the called party subscribes to the CLID feature) based specifically on the called party number. In certain instances, this may be advantageous for both a called party and an associated calling party. For example, consider a single telephone line which has at least two, if not several, telephone numbers registered to it. Typically, such cases may arise when a subscriber to a single VoIP account has registered to it a primary telephone number associated with a primary area code as well as at least one secondary telephone number associated with a second area code different from that of the primary area code. The at least one secondary telephone number (with second area code) permits calling parties located in the region of the second area code to call the VoIP subscriber using the secondary telephone number, thereby avoiding the incurring of long distance toll charges. Similarly, the VoIP subscriber may have another secondary telephone number associated with a third area code registered to it which may be used by a prospective calling party located in a region defined by the third area code to conveniently access the VoIP subscriber without incurring long distance toll charges. However, in all such cases above, calls that are originated by the VoIP subscriber and destined for a given called party will typically only present the primary telephone number registered to the VoIP subscriber to the called party (assuming, of course, that the given called party subscribes to the CLID feature).

In cases where a calling party originates a call to a called party located outside of the region covered by its primary area code, it may be desirable to present the called party with a particular CLID, still representative of the calling party, but based specifically on the telephone number or location (i.e. area code) of the called party. For example, considering the scenario described above, if the VoIP subscriber originates a call to a called party that is located in a region indicative of the second area code associated with its secondary number, it would be desirable to present the called party with a CLID that corresponds to the secondary telephone number of the VoIP subscriber. In this way, if the called party (located in the second area code) wishes to call the calling party back at a later time, they may simply retrieve and use the CLID information conveyed with the originating call (from the calling party) which will, in this case, be indicative of the secondary telephone number of the VoIP subscriber. Using such differentiated calling party ID (or CLID) information, the called party may initiate what amounts to a local call back to the originating calling party (i.e. VoIP subscriber), thereby avoiding the incurring of any long distance toll charges.

The differentiated calling party identifier can take on a variety of forms without departing from the spirit of the present invention. For example, the differentiated calling party identifier 216 can be any one of a CID (caller identification), CNID (caller number identification) or CLID (calling line identification), which are well known in the art. As such, the differentiated calling party identifier 216 may be a list of phone numbers associated with a given communication device (or customer account). Alternatively, the differentiated calling party identifier could be a list of contextual names to be associated with a given communication device (or customer account), such as "James Smith" and "JS Patent Services". In this last example, "JS Patent Services" is the name of a business with which the customer James Smith is associated.

In accordance with a non-limiting example of implementation, having differentiated calling party identifier associated to a given communication device (or customer account) can be limited to only those customers that subscribe to the "differentiated calling party ID" feature. As such, the "differentiated calling party ID" feature would only be available to those customers who subscribe to this feature. In the embodiment shown in FIG. 2, both customer 12 and customer 15 subscribe to the "differentiated calling party ID" feature, and as such, have differentiated calling party identifier information included in each of records $200_2$ to $200_3$. Alternatively, the "differentiated calling party ID" feature could be included within each record $200_1$-$200_k$ without the customer actually needing to separately subscribe to this feature.

As described above, the "differentiated calling party ID" feature is a calling feature that enables a given communication device (or customer) to be associated with at least two calling party identifiers. A single one of these at least two calling party identifiers associated with the given customer device will then be presented to a called party, in certain cases depending on the particular called party number. As such, if a called party subscribes to a Caller Line ID (CLID) display feature (or other calling party identifier display feature), when this called party receives an incoming call originating from a communication device belonging to a customer that has the "Differentiated Calling Party ID" feature, the calling party identifier presented to the called party will depend on the specific called party number.

According to a non-limiting example of the present invention, consider an outgoing call is originated by a telephony subscriber (i.e. the calling party) in Toronto, such as customer 12 using the communication device 16 (e.g. a VoIP phone). As indicated in FIG. 2, communication device 16 has two calling party identifiers with or registered to it, namely a primary telephone number 240, such as (416) ###-#### and a secondary telephone number 244, such as (613) ###-####. The primary telephone number has area code (416) which is indicative of the Toronto region (customer 12's home region) while the secondary telephone number has area code (613) which is indicative of the Ottawa region. The communication device 16 is connected to the switching/routing entity 36 via the network portion 28. As described previously, the network portion may comprise a digital communications link (e.g. Ethernet) and the switching/routing entity may reside in a data network. That is, the switching routing entity may be part of a router (edge or core), a softswitch, or an application server. In other embodiments, the network portion may comprise a digital communications link such as a digital subscriber line (DSL) link or a coaxial cable and the switching/routing entity may be part of a server equipped with a modem. As discussed, various other implementations of network portions and the switching/routing entity are possible. In addition, the switching/routing entity may be a distinct network entity that is communicatively coupled to either a softswitch or application server that provides additional processing capabilities required to implement the invention.

In any case, when a calling party such as customer 12 initiates an outgoing call, the switching/routing entity 36 (e.g. a softswitch or application server) receives an indication of the intent to place the call, the network identifier of the destination (i.e. the called party telephone number) as well as an indication of the network identifier (i.e. primary telephone number) associated with the communication device that is attempting to place the call. Based on the network identifier of the destination or the called party telephone number, the switching/routing entity 36 (softswitch or application server) may modify the calling party identifier (or CLID) that is associated with the outgoing call and that is to be conveyed to the called party. In the example of FIG. 1, the switching/routing entity 36 is coupled to the call processing entity 38 which includes functionality (intelligence) to examine the called party destination information and to determine, by accessing database 44, which of the calling party identifiers (i.e. telephone numbers) registered to the calling party communication device or subscriber account to convey to the called party. This determination may be based on the location or area code of the called party, for example. In an alternative example, the calling party or subscriber of the "Differentiated Calling Party ID" feature (e.g. customer 12) may configure the calling party identifier (or CLID) information to be displayed to given called parties based on the identity of the called party or relationship thereto. In this case, the call processing entitiy 38 may consult a database (e.g. database 44) to determine which of the registered names and/or numbers associated with the calling party account to convey to a given called party based on some rules previously configured by the subscriber or calling party. It will be appreciated that a calling party may configure which of its registered names and/or numbers to convey to a given called party by interacting with a representative, using an IVR or via a website or portal.

Continuing with the example above, it may be desirable, in certain instances, to present a calling party identifier (or CLID) to a given called party corresponding to any of the subscriber's secondary calling party identifiers (or telephone numbers) rather than the subscriber's primary calling party identifier (or telephone number). This may be the case, for example, when the secondary calling party identifier (or telephone number) has an area code different from that of the primary area code and the called party is located in a region indicative of the area code defined by the secondary calling party identifier.

For example, assume that customer 12 located in a region defined by the (416) area code (e.g. Toronto) initiates a call to customer 15 using his/her respective communication device 16, in this case a VoIP phone. As indicated, customer 15 is located in a region defined by the (613) area code (e.g. Ottawa). In such a case, the calling party identifier (or CLID) that will appear on customer 15's communication device will be selected from the list of calling party identifiers (i.e. calling party identifier information) associated with the communication device 16 within record $200_2$. As described above, the calling party identifiers for record $200_2$ comprise at least two calling party identifiers, namely primary telephone number 240 with area code (416) and secondary telephone number 244 with area code (613). Accordingly, the calling party identifier that will appear on the display of customer 15's communication device 20 (e.g. a regular POTS phone with CLID display) will be the secondary telephone number 244 associated with customer 12's communication device 16 (i.e. the telephone number with (613) area code). In this manner, the call will appear as a local incoming call to customer 15. Furthermore, if customer 15 desires to call customer 12 back in the future, customer 15 may simply record and use the secondary telephone number 244 that is received with the incoming call and that is associated with customer 12 in order to effect a "local" call back to customer 12 without incurring long distance toll charges. In a likewise manner, if the originating call from customer 12 is missed by customer 15, customer 15 will be able to simply access their call log and effect what amounts to a "local" callback to customer 12. Similarly, if customer 12 were to call customer 14, the calling party identifier that will appear on the display of customer 14's communication device 18 will also be the secondary telephone number 244 associated with customer 12's communication device 16 since customer 14 is located in the region defined by area code (613).

It will be appreciated that in, certain cases, the local switch number (e.g. defined by the first three digits of the called party number following the area code) may be used in determining the appropriate calling party identifier to transmit with a given call. This may be the case, for example, when a given area code is indicative of a plurality of distinct calling regions, and wherein called parties in each respective region are to be reached using a distinct number.

In an alternative example, the calling party identifier information 216 for a given customer (e.g. customer 12) may comprise merely a local number, such as primary telephone number 240 with (416) area code and a toll-free 1-800 number (not shown). In such a case, all called parties that are local (i.e. having (416) area code) would receive the calling party identifier corresponding to the subscribing customer's local telephone number while all other called parties would receive the calling party identifier corresponding to the subscribing customer's 1-800 toll-free number.

In another alternative, the calling party identifier information 216 for a given customer may comprise a plurality of local numbers as described above and a toll-free 1-800 number that is utilized for all called parties not within the local calling area of one of the plurality of local numbers.

In the above examples, the call processing entity 38 accesses the calling processing information 214 of record $200_2$ that is associated with customer 12 (i.e. the calling party) to determine if he/she subscribes to the "Differentiated Calling Party ID" feature. After determining that customer 12 does subscribe to this feature, the call processing entity 38 examines the called party or destination number to determine or extract the area code associated with the called party number. In this case, the call processing entity 38 determines that the called party number is associated with area code (613). The call processing entity then examines the calling party identifier information 216 listed for record $200_2$ to determine if customer 12's communication device 16 is associated with a calling party identifier that has the same area code as the called party number. In this case, the call processing entity determines that customer 12's communication device 16 has the calling party identifier 244 with the (613) area code. The call processing entity 38 proceeds to modify the outgoing calling party identifier (or CLID) that is to be transmitted with the outgoing call to customer 15 (or customer 14) so that it corresponds to the calling party identifier 244 which has common area code with the called party number, namely (613).

It will be appreciated that a given calling party identifier information associated with a particular customer or communication device is not limited to a telephone number but could also consist of descriptive names, such as "James Smith" or "JS Patent Services", such that no actual telephone number will appear on the called party's communication device. In yet a further alternative, a given calling party identifier could comprise both a descriptive name and telephone number.

With renewed reference to FIG. 1, and as mentioned above, the call processing entity 38 is operative to interact with the switching/routing entity 36 and the database 44 in order to effect various call processing operations when a communication device (such as any one of the communication devices 16, 18 or 20) connected to the switching/routing entity 36 receives an incoming call, originates an outgoing call, or participates in a call in progress. More particularly, the call processing entity 38 is operative to process calls arriving at the switching/routing entity 36. The processing of a given call by the call processing entity 38 can be viewed as the call processing entity 38 performing one or more operations to process the given call. In this embodiment, the call processing entity 38 is operative to process calls in accordance with a set of rules. Each rule may be defined by a condition, an operation to be performed if the condition is satisfied for a given call, and an operation to be performed if the condition is not satisfied for a given call (e.g., <condition> <operation to be performed if condition is satisfied> <operation to be performed if condition is not satisfied>). For a given rule, the condition may be defined in terms of one or more characteristics of a call. Examples of characteristics of a call are: its origin, which may be expressed, for instance, as a telephone number and/or other identifier (e.g., an IP address or SIP URI) associated with a communication device that originated the call; its intended destination, which may be expressed, for instance, as a telephone number and/or other identifier (e.g., an IP address or SIP URI) associated with a communication device for which the call is destined; and a time at which it was originated (e.g., a date, hour, minute, etc.). For a given rule, the condition may also be defined in terms of call processing information (in this case, telephony feature information) that is included in the records $200_1$-$200_k$ of the database 44. For a given rule, the operations to be performed based on whether the condition is satisfied depends on the nature of the given rule (e.g., route a call to its intended destination, forward a call in accordance with a call forwarding feature, cause production of an audio signal in accordance with a distinctive ringing feature, prevent establishment of an outgoing call in accordance with an outgoing call barring feature, etc.). The call processing entity 38 comprises suitable hardware, firmware, software, control logic, or a combination thereof for implementing its functionality. In accordance with a non-limiting example of implementation, the call processing entity 38 may be a softswitch, or any other type of IP application server.

In the embodiment shown, the call processing entity 38 includes a plurality of functional units, including an input/output unit 40 and a processing unit 42, whose functionality will be described in further detail below.

Continuing with FIG. 1, the call processing entity 38 for implementing the "differentiated calling party ID" feature contemplated herein is communicatively coupled to the switching/routing entity 36, and the database 44. As will be further detailed later on, the call processing entity 38 is operative for accessing the records $200_1$ to $200_k$, within the database 44 upon receipt of an indication of an attempt to place a call (or issue an SMS or other text message) by a given communication device. On the basis of the information within the database 44, the call processing entity 38 can process the call, or other type of communication, in accordance with the call processing information. In the case where a communication device that is attempting to make a call is representative of a customer who subscribes to the "Differentiated Calling Party ID" feature, the call processing entity 38 will determine which of the calling party identifiers associated with that particular communication device (or, more generally, subscriber) is to be communicated in association with the outgoing call (or SMS or text message) to the called party or destination communication device.

In some embodiments, it will be appreciated that the switching/routing entity 36, the call processing entity 38 and the database 44 may reside in a common network element of the communications network 10. In such embodiments, links between these components may be physical (i.e., wired or wireless) links or logical links. In other embodiments, different ones of the switching/routing entity 36, the call processing entity 38 and the database 44 may reside in different or common network elements of the communications network 10 that are interconnected via one or more physical links and possibly other elements (e.g., gateways) of the communications network 10. Also, although it is depicted in FIGS. 1 and 2 as being one component, it will be appreciated that the database 44 may be distributed in nature, i.e., it can have portions of its content stored in different memory units possibly located in different network elements of the communications network 10. For example, the call processing information 214 shown may be stored in a memory unit dedicated to storing this information and distinct from a memory unit that stores other contents of the database 44 shown in FIG. 2.

The interaction between the switching/routing entity 36, the call processing entity 38, and the database 44, for implementing the "differentiated calling party ID" of the present invention feature will now be described in more detail with reference to the flow diagram depicted in FIG. 3.

Step 310

Firstly, at step 310, the call processing entity 38 receives over a network connection an indication of an attempt by a communication device to place an outgoing call. Although we will refer to an attempt to place an outgoing call in this example for the sake of simplicity, it should be appreciated that the same procedure could take place in the case where an attempt to send an instant message, an SMS, a video communication, a multimedia communication or any other type of communication is initiated. As such, although the present description refers to an attempt to place a "call", as used herein, the term "call" includes telephone calls, SMS messages, any other form of text messages, video messages, as well as any other type of telephony action that is initiated by a given calling party.

For the sake of explanation, let us assume that customer 12 initiates a call to customer 15. More specifically, customer 12 uses his VoIP phone (communication device 16) to call customer 15 on his home POTS phone (communication device 20).

When customer 12 initiates the call, the call processing entity 38 will receive from the switching/routing entity 36 an indication that communication device 16 is attempting to make a call. In general, the indication of an attempt to make a call is firstly received at the switching routing entity 36 (via the gateway 32 in the case of the VoIP communication device 16), and is passed to the call processing entity 38 such that the call processing entity 38 can process the outgoing call in the appropriate way. In a specific example of implementation, the indication of the attempt by communication device 16 to place an outgoing call is received at the input/output unit 40 of the call processing entity 38.

When the call processing entity 38 receives the indication of an attempt to make a call, the call processing entity 38 also receives an indication of the network identifier 212 associated with the communication device that is attempting to place the call. In this manner, the call processing entity 38 can access the call processing information 214 that is associated with that particular communication device such that it knows how to process calls originating from that particular communication device or subscriber. As such, in this case where communication device 16 is attempting to place an outgoing call, the call processing entity 38 will receive an indication of the attempt to make a call, and will receive information indicative that it is communication device 16 that is attempting to place the call. As mentioned above, and as shown in FIG. 2, the network identifier associated with communication device 16 can be the IP address and/or telephone number associated with VoIP communication device 16.

It will be appreciated that the indication of an attempt to place a call can be received at the call processing entity 38 either before or after the user of a communication device has entered call destination information or called party number. As such, keeping with the example above, the call processing entity 38 can receive an indication that customer 12 is attempting to make a call using communication device 16, before customer 12 has entered the desired called party number into the communication device 16. In such a case, the indication of the attempt to make a call can be received at the call processing entity 38 in response to an "off hook" condition at the communication device 16. In the case of a POTS or VoIP phone, the "off hook" condition can be detected when a hand receiver is lifted off the hook. In the case of a wireless phone, such as communication device 18 in FIG. 1, the off hook condition can be detected when the "send/talk" button is pressed, when a clamshell-type of phone is opened, or when a dedicated "off hook" button, or any other designated button, on the communication device is activated. This manner of detecting an attempt to make a call prior to the desired called party number or call destination information being provided is described in more detail in co-pending application entitled "A Method and System for Establishing a Connection with a Packet-Based Application Server", filed on Dec. 21, 2007 as international (PCT) patent application no. PCT/CA2007/002346, the contents of which are incorporated herein by reference.

In the presently described embodiment, the indication of an attempt to make a call is not received at the call processing entity 38 until the called party number indicative of the destination communication device has been entered into the calling communication device. For example, the call processing entity 38 does not receive an indication that communication device 16 is attempting to make a call, until the desired called party number for customer 15 has been entered by customer 12 into his communication device 16. For instance, where the communication device 16 is a VoIP phone (as in the example of FIG. 1), the call processing entity may only receive an indication that customer 12 is attempting to make a call after the called party or destination number is entered and the "send" button is pressed. Similarly, if communication device 16 were instead a wireless phone, an indication of an attempt by customer 12 to make a call would typically only be received at call processing entity 38 following the "talk" or "send" button being pressed by customer 12 after the called party or destination number is entered.

The called party number can be any identifier associated with a particular communication device and that is indicative of a call destination. For example, the called party number can be a phone number, an IP address or a name, among other possibilities. In the case where the call destination information is a phone number, this call destination information can take the form of DTMF digits, CDMA or GSM packets or digital packets that are entered via a numeric keypad, among other possibilities, into the originating communication device. In the case where the call destination information is an IP address, this information can be entered into the calling party communication device via a keypad, or via speech signals. Likewise, in the case where the call destination information is the name of the party being called, it can be entered into the communication device via speech signals such that the user simply needs to utter the name of the called party into the communication device. It should be appreciated that in the case where the call destination information is a phone number, this call destination information could also be entered into the communication device via speech signals. Alternatively, the called party number or call destination information could be retrieved from an address book or contacts database stored locally on the communication device or at the network level.

Step 320

At step 320, following receipt of an indication of an attempt by a communication device to initiate an outgoing telephony action (in this case, to place a call), the call processing entity 38 determines a particular calling party identifier to be associated to the communication device that is attempting to place the call (assuming that the communication device that is attempting to place the call belongs to a subscriber of the "Differentiated Calling Party ID" feature, or that this feature is available to all customer). As mentioned previously and, in accordance with the present invention, more than one calling party identifier may be associated with or registered to a given communication device.

More specifically, based on the network identifier 212 of the originating communication device, the called party number (i.e. call destination information) and information stored in the database 44, the call processing entity 38 can select or determine an appropriate calling party identifier that is to be associated with the outgoing call (i.e. transmitted to the called party). In accordance with a specific example, the call processing entity 38 searches through the database 44 in order to locate a record $200_1$-$200_k$ that includes the network identifier of the communication device that is attempting to initiate the call. Once that record has been located, the call processing entity 38 can determine from that record the calling party identifier that is to be associated with the communication device in respect of the outgoing call.

Continuing with the above example wherein it is customer 12 that is attempting to place a call using communication device 16, upon receipt at the call processing entity 38 of the indication that communication device 16 is attempting to place a call, the call processing entity 38 will access the record $200_2$ associated with communication device 16. In this non-limiting example, the network identifier 212 associated with communication device 16 is the IP address and/or telephone number associated with VoIP phone 16. As mentioned above, this network identifier is provided to the call processing entity 38 upon receipt of the indication of the attempt to place a call, such that the call processing entity 38 knows which communication device is attempting to place a call.

The call processing entity 38 then searches through the records $200_1$-$200_k$ in order to locate the record $200_2$ that includes the network identifier 212 associated with communication device 16. Once record $200_2$ has been located, the call processing entity 38 determines that the customer or line associated with communication device 16 subscribes to the "Differentiated Calling Party ID" feature. Subsequently, the call processing entity 38 determines or selects a calling party identifier from the calling party identifier information 216 in record $200_2$ to be transmitted with the outgoing call to the called party. In the example considered above, customer 12 with primary telephone number (416) ###-#### places a call to customer 15 who is located in a region defined by area code (613). As such, the calling party identifier transmitted to customer 15's communication device 20 will be calling party identifier 244 having area code (613).

In the above description of step 320, the call processing entity 38 examines the desired called party number in order to determine or extract the area code associated with the called party number. The call processing entity then examines the calling party identifier information 216 associated with record $200_2$ to determine if customer 12's communication device 16 is associated with a calling party identifier that has the same area code as the called party number. If so, the call processing entity 38 proceeds to modify the outgoing calling party identifier (or CLID) that is transmitted with the outgoing call so that it corresponds to the calling party identifier having the same area code as the called party number. If it is determined that communication device 16 is not associated with any calling party identifier having the same area code as the called party number, the call processing entity 38 may cause the primary calling party identifier registered to the communication device 16 to be transmitted with the outgoing call to the called party. Alternatively, in cases where the calling party identifier information for communication device 16 includes a toll-free 1-800 number, the call processing entity 38 could modify the outgoing calling party identifier (or CLID) that is transmitted with the outgoing call so that it corresponds to the toll-free 1-800 number. In other embodiments, the call processing entity 38 could allow for customer 12 to choose which of calling party identifiers associated with communication device 16 to transmit with the outgoing call (via IVR or a menu option display on communication device 16). It will be appreciated, however, that in an alternative embodiment, the calling processing entity 38 may, in step 320, select or determine which calling party identifier to transmit with an outgoing call by determining if there is an association or link between the called party number and a respective one of the calling party identifiers registered to the communication device that is used to originate the call. Such an example is described later on with reference to a call made by customer 15 to customer 14.

With reference to the above example, it should also be appreciated that a given calling party identifier transmitted to a called party could also include the name of the customer or entity originating the call, such as "James Smith".

Step 330

At step 330, once the call processing entity 38 has determined the calling party identifier to be associated with an outgoing call made using a particular communication device, the call processing entity 38 then causes the selected calling party identifier to be output in association with the outgoing call being made using that communication device. The manner in which the selected calling party identifier is output to the called party can be done in a variety of ways, all of which are included within the scope of the present invention. For example, the calling party identifier can be included within information forwarded to the called party's telephone equipment during the ringing signal or when the call is being set up but before the call is answered.

Continuing with the example described above, in the case where customer 12 is attempting to place a call to the communication device 20 that is associated with customer 15, once the call processing entity 38 has determined the appropriate calling party identifier 244 to be associated with the communication device 16 that is being used to place the call, then that calling party identifier is transmitted or output to communication device 20 along with the outgoing call. As such, when communication device 20 starts to ring, calling party identifier 244 having area code (613) is presented to customer 15. As such, customer 15, who is the called party, will see the calling party identifier 244 and the call will appear to have originated from a local number.

It will be appreciated that the transmitted calling party identifier can be conveyed to the called party in a variety of different ways. For example, the transmitted calling party identifier may be displayed to the called party via alphanumeric characters on a display screen of the called communication device, or on a display of a separate associated device. Alternatively, the transmitted calling party identifier may be conveyed to the called party via an audio announcement from speakers contained within the called communication device.

In accordance with a non-limiting example, a calling party identifier can be output in association with the outgoing call regardless of whether or not the destination communication device is able to display or otherwise convey the transmitted calling party identifier to the called party or customer. In accordance with an alternative example, the call processing entity may determine, based on the called party number or destination information provided by the calling party communication device, whether or not the called party subscribes to a calling party identifier display (e.g. caller line identification or CLID) feature, or whether the called party or destination communication device has the hardware (such as a display screen or speakers) for conveying calling party identifier information to the called party. In the case where the communication device associated with the called party is unable to convey calling party identifier information to the called party, then the call processing entity may not output the calling party identifier information to that called party communication device. However, in the case where the called party does subscribe to a calling party identifier display feature, and the called party or destination communication device is capable of conveying calling party identifier information to the called party, then the call processing entity 38 will output calling party identifier information to the called party.

In addition, the calling party identifier information 216 found within database 44 could be at least partially user configurable. For example, in the case of the communication device 16 associated with record $200_2$, customer 12 could be provided with the ability to configure the calling party identifier information 216 in a variety of ways. For example, the configuration could be done by interacting with a representative of the service provider, by interacting with an IVR or by using a website associated with the service provider. In accordance with a non-limiting example, customer 12 could configure the calling party identifier information 216 contained within record 200₂ to convey a customer name (to which the account is registered) with or in place of any of the listed calling party identifiers 240 and 244. In such a manner, the user can configure how the calling party identifier transmitted to the called party will appear (i.e. with or without a calling party name, what the calling party name will be, etc). For example, assuming customer 12's name is Bob Jones, customer 12 could configure any one or all of the calling party identifiers 240 or 244 registered to his communication device 16 to be "Bob Jones" or "Mr. Jones", among other possibilities. The customer 12 could enter how the name should appear (i.e. all small case, all upper case, etc.).

Figure 3:
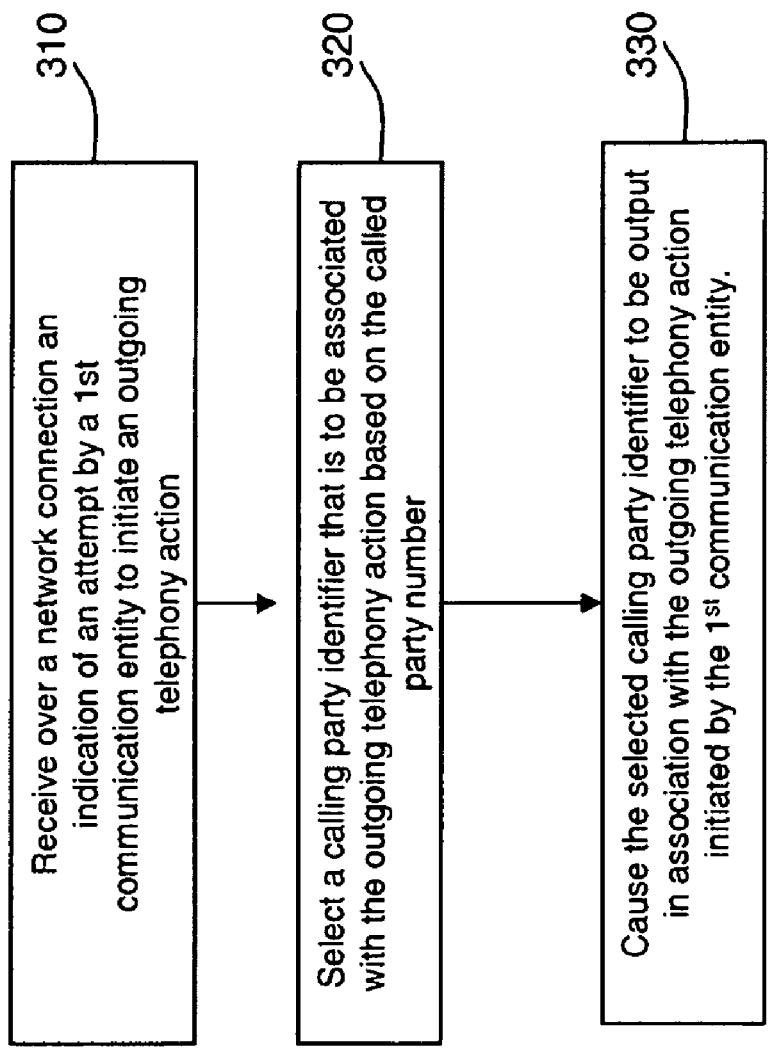
FIG. 3 is a flow diagram depicting a method for causing a differentiated caller line identification (CLID) to be sent to a called party based on the called party number in accordance with a non-limiting embodiment of the present invention.

As alluded to earlier, in an alternate example of implementation, step 320 in FIG. 3 may instead involve determining if the called party number or identifier entered by a customer originating a call is specifically associated with or otherwise linked to a particular calling party identifier that is listed in the calling party identifier information 216 for that particular customer. In a non-limiting example, the concept of the invention could be applied in the PSTN world to modify the outgoing calling party identifier information (e.g. CLID) of a subscriber line from the primary telephone number associated with the subscriber line (or account) to any one of secondary telephone numbers associated with the same line (or account), based specifically on called party number. In this respect, the Ident-A-Call™ service offered by Bell Canada Enterprises Limited, is an example whereby a given PSTN subscriber line may have more than one telephone number associated with it. For example, a primary telephone number may be associated with a home (H) telephone line while a secondary number of the same PSTN line may be associated with a work-related (W) telephone line. In such cases, it will be appreciated that the processing logic to implement the method of the present invention may reside at the network level (e.g. such as at an appropriate DMS of the PSTN) such that an appropriate calling party identifier (e.g. CLID) may be conveyed to a called party based on the called party or destination number.

Referring back to FIGS. 1 and 2, consider that customer 15 subscribes to such an Ident-A-Call™ or similar service and, thus, has two calling party identifiers or telephone numbers registered to the PSTN line associated with his communication device 20 (a regular POTS phone). In this case, the calling party identifier information 216 for customer 15 comprises a primary calling party identifier or telephone number 260 that is to be associated with all personal matters and a secondary calling party identifier or telephone number 264 that is to be associated with all work-related matters. In this example, all work-related telephone numbers for customer 15 may be stored in a "work contacts" address book (not shown), for example as part of database 44, at the network level (e.g. at the DMS) and may be made available to the processing logic. Then, when any calls are originated on said PSTN line by customer 15 using communication device 20, the processing logic may examine the called party number to determine if it matches any of the work-related numbers stored for customer 15 in his/her respective "work contacts" address book. If the called party number is determined to match a work-related number, the outgoing calling party identifier (e.g. CLID) information that would typically be transmitted with the outgoing call (i.e. the primary telephone number 260 registered to communication device 20) could be modified to present the called party with the calling party identifier (or CLID information) corresponding to the secondary (or work-related) calling party identifier 264 registered to customer 15's communication device 20. In this way, customer 15's "personal" or "home" telephone number is masked from customer 14 and all other work-related contacts to whom a call is placed. Any future calls made by a work-related contact back to customer 15 may then be made using the appropriate calling party identifier 264 associated with customer 15's "work" line. Thus, in addition to providing customer 15 the ability to accurately provide calling party identifier information that is indicative of the intended purpose or context for an outbound call (i.e. personal or work-related), a called party can conveniently place a call back to the originating calling party (in this example, customer 15) using the appropriate received calling party identifier or telephone number (in this case, the secondary work-related telephone number).

Alternatively, it will be appreciated that customer 15 may be part of a group (e.g. company) and communication device 20 may be a communication device associated with the group. In such a case, the calling party identifier information for customer 15 may also be linked to a group database (e.g. company directory) where all "group" contact information (e.g. phone numbers, names within a company etc.) is stored. Then, when any calls are originated by customer 15 using communication device 20, the processing logic may examine the called party number or information to determine if it matches any group contact information stored in the group database. For example, if the called party number is determined to match a group phone number, the outgoing calling party identifier (e.g. CLID) information that is transmitted with the outgoing call could be modified to present the called party with calling party identifier (or CLID) information corresponding to the "group" calling party identifier registered to customer 15's communication device 20.

Continuing with the example, assume customer 14 is purely a work-related contact of customer 15 and is also located in the Ottawa region having area code (613). In such a case, customer 14 may only be aware of customer 15's secondary or work-related number 264 (e.g. from a business card obtained from customer 15). It may be the case that customer 14 may not be aware of or recognize the primary calling party identifier (i.e. the personal or home number) 260 associated with or registered to customer 15 and, accordingly, may not pick up an incoming call that presents the primary calling identifier 260 associated with customer 15. Advantageously, using the methodology of the present invention, whenever customer 15 initiates a call to customer 14, the calling party identifier presented to customer 14's communication device 18 would be modified to correspond to the secondary calling party identifier 264 or telephone number associated with or registered to customer 15's PSTN line (e.g. the secondary calling party identifier 264 is stored as calling party identifier information 216 within record 200₃ of database 44).

It will also be apparent that the above-described method and system could also be applied in a business or commercial setting, for example for companies having a distributed workforce. In another non-limiting scenario, consider the case of a customer service representative working for a large national/international company and needing to call a customer located in a different area code from that of the customer service representative originating the call. In such a case, it may be desirable for the calling party identifier (e.g. CLID) information conveyed to the customer to be representative of a local telephone number (i.e. having the customer's area code) or corporate toll-free 1-800 number and by which the customer may place a call back to the company at a later time or date, if need be. For example, such may be the case if the customer is not at home at the time of the originating call from the customer service representative, and thereby misses the call. In many instances, it is common for calling party identifier (e.g. CLID) information for incoming calls to also be logged locally on the customer's device. In this example, upon returning home, the customer could retrieve the missed call information from the call log and conveniently initiate what amounts to a local or toll-free telephone call back to the company without incurring long distance toll charges.

Two examples have been described above for selecting the calling party identifier (or CLID) information to be transmitted with an outgoing call. A first example selected the appropriate outgoing calling party identifier based on the area code (and, optionally, local switch number) of the called party number while, in a second example, the appropriate calling party identifier was selected based on the presence of an association or link of the called party number with a specific calling party identifier. It will be appreciated, however, that a third scheme for selecting the calling party identifier associated with an outgoing call and that is a composite of the two above-described schemes could exist. For example, the "name" portion of a calling party identifier presented or transmitted with an outgoing call may be based on the called party or destination number (e.g. the presence of the called party number in a given customer's address book) while the "number" portion of the calling party identifier that is transmitted could be determined based on the area code (and, optionally local switch number) of the called party.

It will further be appreciated that although the above-described method and system has been described primarily in the context of an originating call being made using a VoIP communication system, the method and system could also be implemented using other telephony systems including those employing PSTN and wireless (e.g. cellular) technologies.

In yet a further example, it will be appreciated to those skilled in the art that processing logic (hardware/software) to implement the described inventive method and system may be included at the network level (e.g. at the MSC) of a wireless communication system. For example, with reference back to FIG. 1, it may be possible for customer 14 to have more than one calling party identifier associated with or registered to wireless communication device 18. Then, when customer 14 (i.e. the calling party) initiates an outgoing call with communication device 18 to a particular called party, the appropriate calling party identifier transmitted to the called party is selected based on the destination or called party number.

Those skilled in the art will appreciate that, in some embodiments, certain functionality of a given component described herein (including the switching/routing entity 36 and the call processing entity 38) may be implemented as pre-programmed hardware or firmware elements (e.g., application specific integrated circuits (ASICs), electrically erasable programmable read-only memories (EEPROMs), etc.) or other related elements. In other embodiments, a given component described herein (including the switching/routing entity 36 and the call processing entity 38) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

While specific embodiments of the present invention have been described and illustrated, it will be apparent to those skilled in the art that further modifications and variations can be made without departing from the scope of the invention as defined in the appended claims.

We claim:

1. A method for modifying the calling party identifier information associated with a call originated by a calling party and destined for a called party, the calling party being associated with a plurality of calling party identifiers, the method comprising:
   receiving identifier information indicative of the called party including an identifier of geographic location of the called party;
   determining a first calling party identifier of the plurality of calling party identifiers to be conveyed to the called party based on the identifier of geographic location of the called party; and
   causing the first calling party identifier to be conveyed in association with the call.

2. A method as defined in claim 1, wherein the identifier information indicative of the called party comprises a network identifier.

3. A method as defined in claim 2, wherein the network identifier comprises a telephone number and the identifier of geographic location of the called party comprises a called party area code of the telephone number.

4. A method as defined in claim 1 further comprising:
   receiving identifier information indicative of a second called party including an identifier of geographic location of the second called party;
   determining a second calling party identifier of the plurality of calling party identifiers to be conveyed to the second called party based on the identifier of geographic location of the second called party; and
   causing the second calling party identifier to be conveyed in association with a call originated by the calling party and destined for the second called party.

5. A method as defined in claim 1, wherein each of the plurality of calling party identifiers comprise a respective network identifier.

6. A method as defined in claim 5, wherein the network identifiers for each of the plurality of calling party identifiers comprising respective telephone numbers including different area codes; and wherein said determining is performed at least in part on the basis of the area codes corresponding to each of the plurality of calling party identifiers.

7. A method as defined in claim 6, wherein the identifier information indicative of the called party comprises a telephone number and the identifier of geographic location of the called party comprises a called party area code of the telephone number; and wherein said determining comprises selecting one of the plurality of calling party identifiers that comprises a telephone number with an area code related to the called party area code.

8. A method as defined in claim 5, wherein the network identifier for a first of the plurality of calling party identifiers comprising a toll-free telephone number and the network identifier for a second of the plurality of calling party identifiers comprising a local telephone number including a calling party area code; and wherein said determining is performed at least in part on the basis of the calling party area code.

9. A method as defined in claim 8, wherein the identifier information indicative of the called party comprises a telephone number and the identifier of geographic location of the called party comprises a called party area code of the telephone number; and wherein said determining comprises selecting the second of the plurality of calling party identifiers if the calling party area code is related to the called party area code.

10. A method as defined in claim 8, wherein the identifier information indicative of the called party comprises a telephone number and the identifier of geographic location of the called party comprises a called party area code of the telephone number; and wherein said determining comprises selecting the first of the plurality of calling party identifiers if the calling party area code is not related to the called party area code.

11. A method as defined in claim 8, wherein the identifier information indicative of the called party comprises a called party telephone number; and wherein said determining comprises selecting the first of the plurality of calling party identifiers if a call from the called party telephone number to the local telephone number would be a toll call.

12. A network entity comprising:
an input for receiving an indication of an attempt by a calling party to place a call to a called party, said indication comprising identifier information indicative of the called party including an identifier of geographic location of the called party; and
a processing unit for determining a first calling party identifier of a plurality of calling party identifiers associated with the calling party to be conveyed to the called party based on the identifier of geographic location of the called party and causing the first calling party identifier to be conveyed in association with the call.

13. A network entity as defined in claim 12, wherein the identifier information indicative of the called party comprises a network identifier.

14. A network entity as defined in claim 13, wherein the network identifier comprises a telephone number and the identifier of geographic location of the called party comprises a called party area code of the telephone number.

15. A network entity as defined in claim 12, wherein the call is a first call and the called party is a first called party; wherein the input is further operable for receiving an indication of an attempt by a calling party to place a second call to a second called party, said indication comprising identifier information indicative of the second called party including an indication of geographic location of the second called party; and wherein the processing unit is further operable for determining a second calling party identifier of the plurality of calling party identifiers associated with the calling party to be conveyed to the second called party based on the identifier of geographic location of the second called party and causing the second calling party identifier to be conveyed in association with the second call.

16. A network entity as defined in claim 12, wherein each of the plurality of calling party identifiers comprise a respective network identifier.

17. A network entity as defined in claim 16, wherein the network identifiers for each of the plurality of calling party identifiers comprise respective telephone numbers including different area codes; and wherein said processing unit determines a calling party identifier to be conveyed at least in part on the basis of the area codes corresponding to each of the plurality of calling party identifiers.

18. A network entity as defined in claim 17, wherein the identifier information indicative of the called party comprises a telephone number and the identifier of geographic location of the called party comprises a called party area code and wherein said processing unit determines a calling party identifier to be conveyed by selecting one of the plurality of calling party identifiers that comprises a telephone number with an area code related to the called party area code.

19. A network entity as defined in claim 16, the network identifier for a first of the plurality of calling party identifiers comprising a toll-free telephone number and the network identifier for a second of the plurality of calling party identifiers comprising a local telephone number including a calling party area code; and wherein said processing unit determines a calling party identifier to be conveyed at least in part on the basis of the calling party area code.

20. A network entity as defined in claim 19, wherein the identifier information indicative of the called party comprises a telephone number and the identifier of geographic location of the called party comprises a called party area code and wherein said processing unit determines a calling party identifier to be conveyed by selecting the second of the plurality of calling party identifiers if the calling party area code is related to the called party area code.

21. A network entity as defined in claim 19, wherein the identifier information indicative of the called party comprises a telephone number and the identifier of geographic location of the called party comprises a called party area code and wherein said processing unit determines a calling party identifier to be conveyed by selecting the first of the plurality of calling party identifiers if the calling party area code is not related to the called party area code.

22. A network entity as defined in claim 19, wherein the identifier information indicative of the called party comprises a called party telephone number and wherein said processing unit determines a calling party identifier to be conveyed by selecting the first of the plurality of calling party identifiers if a call from the called party telephone number to the local telephone number would be a toll call.

23. A computer-readable storage medium comprising a program element for execution by a network entity, said program element comprising:
first program code for detecting receipt of an indication of an attempt by a calling party to place a call to a called party, said indication comprising identifier information indicative of the called party including an identifier of geographic location of the called party;
second program code for determining a first calling party identifier of a plurality of calling party identifiers associated with the calling party to be conveyed to the called party based on the identifier of geographic location of the called party; and
third program code for causing the first calling party identifier to be conveyed in association with the call.

24. A method for modifying the calling party identifier information associated with a call originated by a calling party and destined for a called party, the calling party being associated with a plurality of calling party identifiers, the method comprising:
receiving identifier information indicative of the called party;
determining if the called party is within a contact list of the calling party based upon the identifier information indicative of the called party;
determining a calling party identifier of the plurality of calling party identifiers to be conveyed to the called party based upon whether the called party is within the contact list of the calling party; and
causing the calling party identifier to be conveyed in association with the call.

25. A method as defined in claim 24, wherein the identifier information indicative of the called party comprises a network identifier.

26. A method as defined in claim 24, wherein the determining a calling party identifier of the plurality of calling party identifiers to be conveyed to the called party comprises determining to convey a first calling party identifier if the called party is within the contact list of the calling party and determining to convey a second calling party identifier if the called party is not within the contact list of the calling party.

27. A method as defined in claim 26, wherein the first calling party identifier comprises a first network identifier associated with the calling party and the second calling party identifier comprises a second network identifier associated with the calling party.

28. A method as defined in claim 27, wherein the second network identifier is a primary network identifier associated with a device used by the calling party to originate the call and the first network identifier is not a primary network identifier associated with the device used by the calling party to originate the call.

29. A method as defined in claim 27, wherein the second network identifier is a network identifier associated with personal matters of the calling party and the first network identifier is a network identifier associated with work matters of the calling party.

30. A method as defined in claim 27, wherein the contact list comprises a list of parties predetermined by the calling party that the calling party desires to have use the first network identifier to contact the calling party.

31. A method as defined in claim 27, wherein the contact list comprises a list of work-related contacts predetermined by the calling party and the first network identifier comprises a work-related network identifier associated with the calling party.

32. A network entity comprising:
an input for receiving an indication of an attempt by a calling party to place a call to a called party, said indication comprising identifier information indicative of the called party; and
a processing unit for determining if the called party is within a contact list of the calling party based upon the identifier information indicative of the called party;
determining a calling party identifier of the plurality of calling party identifiers to be conveyed to the called party based upon whether the called party is within the contact list of the calling party; and causing the calling party identifier to be conveyed in association with the call.

33. A network entity as defined in claim 32, wherein the identifier information indicative of the called party comprises a network identifier.

34. A network entity as defined in claim 32, wherein, to determine the calling party identifier to be conveyed, the processing unit is operable to determine to convey a first calling party identifier if the called party is within the contact list of the calling party and determine to convey a second calling party identifier if the called party is not within the contact list of the calling party.

35. A network entity as defined in claim 34, wherein the first calling party identifier comprises a first network identifier associated with the calling party and the second calling party identifier comprises a second network identifier associated with the calling party.

36. A network entity as defined in claim 35, wherein the second network identifier is a primary network identifier associated with a device used by the calling party to originate the call and the first network identifier is not a primary network identifier associated with the device used by the calling party to originate the call.

37. A network entity as defined in claim 35, wherein the second network identifier is a network identifier associated with personal matters of the calling party and the first network identifier is a network identifier associated with work matters of the calling party.

38. A network entity as defined in claim 35 further comprising the contact list of the called party.

39. A network entity as defined in claim 38, wherein the contact list comprises a list of parties predetermined by the calling party that the calling party desires to have use the first network identifier to contact the calling party.

40. A network entity as defined in claim 38, wherein the contact list comprises a list of work-related contacts predetermined by the calling party and the first network identifier comprises a work-related network identifier associated with the calling party.

* * * * *